United States Patent [19]

Komurasaki

[11] Patent Number: 5,048,050
[45] Date of Patent: Sep. 10, 1991

[54] SEMICONDUCTOR LASER APPARATUS

[75] Inventor: Takeshi Komurasaki, Yokohama, Japan

[73] Assignee: Ricoh Company, Ltd., Tokyo, Japan

[21] Appl. No.: 485,825

[22] Filed: Feb. 27, 1990

Related U.S. Application Data

[63] Continuation of Ser. No. 291,128, Dec. 28, 1988, abandoned.

[30] Foreign Application Priority Data

Jan. 8, 1988 [JP] Japan ................... 63-2160

[51] Int. Cl.⁵ .............................................. H01S 3/08
[52] U.S. Cl. .................................... 372/101; 372/108; 372/107
[58] Field of Search ................... 372/44, 103, 24, 107, 372/108, 65; 350/96.21

[56] References Cited

U.S. PATENT DOCUMENTS 4,295,152 10/1981 Khoe et al. ................... 350/96.21
4,661,959 4/1987 Kaneko ........................... 372/103

FOREIGN PATENT DOCUMENTS 0175617 8/1986 Japan ............................... 372/43

Primary Examiner—Léon Scott, Jr.

[57] ABSTRACT

A semiconductor laser apparatus includes a fitting member having first and second openings connected each other and concentric with each other, the first opening serves as a semiconductor laser fitting portion, the second opening serves as a collimator lens fitting portion, a semiconductor laser fitted into the first opening, and a collimator lens fitted into the second opening.

10 Claims, 4 Drawing Sheets

SEMICONDUCTOR LASER APPARATUS

This is a continuation of application Ser. No. 291,128, filed Dec. 28, 1988, now abandoned.

BACKGROUND OF THE INVENTION

The present invention generally relates to a semiconductor laser apparatus, and more particularly, to a semiconductor laser apparatus applicable to an optical source for use in an optical recording apparatus such as a facsimile machine, a copier and a printer.

It is known to use a semiconductor laser apparatus as an optical source. A conventional semiconductor laser apparatus includes a semiconductor laser, a collimator lens and a slit plate for shaping a scanning beam emitted from the semiconductor laser. The collimator lens and the slit plate are arranged on an optical axis of the semiconductor laser.

FIGS. 1 through 3 show an example of the conventional semiconductor laser apparatus. Referring to these figures, a semiconductor laser 1 is attached so as to be inserted into an engagement hole 2a formed in a base 2 in a state where the semiconductor laser 1 is pressed by a presser plate 3. A back surface of the presser plate 3 is pressed and held by a laser drive board 4, which is secured on board holders 6 by screws 5. The board holders 6 are secured to a plate by screws (not shown). A plate 7 is secured to the base 2 by two screws 8. On the laser drive board 4, there are mounted an electric circuit used for driving the semiconductor laser 1. Leads extending from the semiconductor laser 1 penetrate the presser plate 3, and are connected to terminals of the electric circuit formed on the laser drive board 4 by soldering. A lens holder 10 which accommodates a collimator lens 9 is secured to the plate 7. A wave-shaped washer 11 for eliminating the occurrence of back rush is interposed between the lens holder 10 and the plate 7.

The front of the plate 7 is covered with an aperture holder 12, which is secured to the plate 7 by a screw 13. The aperture holder 12 has a cylindrical portion 12A, at an outlet end of which there are formed two craws 12A-1 and 12A-2 opposite to each other. A cutout 12A-3 is formed in an edge portion of the cylindrical portion 12A. In the cylindrical portion 12A, there is formed a step portion 12A-4.

A slit plate 14 has a slit 14A for shaping the laser beam emitted from the semiconductor laser 1, engagement edges 14B-1, 14B-2 and 14B-3 which fit an inner wall of the cylindrical portion 12A, and a projection portion 14C which engages with the cutout 12A-3. The slit plate 14 is slightly wider than the distance between the opposite ends of the craws 12A-1 and 12A-2. The slit plate 14 is positioned in the cylindrical portion 12A as follows. The first step is to make the projection portion 14C engage with the cutout 12A-3. The second step is to pass the slit plate 14 over the craws 12A-1 and 12A-2 by utilizing elasticity thereof. The third step is to fit the engagement edges 14B-1, 14B-2 and 14B-3 to the inner wall of the cylindrical portion 12A.

In the above-mentioned semiconductor laser apparatus, the collimator lens 9 is used for collimating the divergent laser beam emitted from the semiconductor laser 1. Conventionally, two adjustments are needed for suitably collimating the laser beam. One of the adjustments is an optical axis adjustment which aims to have the optical axis of the collimator lens 9 coincide with the optical axis of the semiconductor laser 1. The other adjustment is to have a light emission point of the semiconductor laser 1 coincide with the focal position of the collimator lens 9.

However, a long time is taken to perform the above-mentioned adjustments. This prevents the reduction in costs for manufacturing semiconductor laser apparatuses. For example, referring to FIG. 3, the optical axis adjustment is carried out by relatively shifting the base 2 onto which the semiconductor laser 1 is fastened, and the plate 7 on which the lens folder 10 is mounted. Thereafter, the base plate 2 and the plate 7 are mutually secured by the two screws 8. The above-mentioned adjustment is very troublesome.

SUMMARY OF THE INVENTION

It is therefore a general object of the present invention to provide a novel and useful semiconductor laser apparatus in which the above-mentioned disadvantages are eliminated.

A more specific object of the present invention is to provide a semiconductor laser apparatus which does not need a troublesome optical axis adjustment.

The other objects, features and advantages of the present invention can be achieved by a semiconductor laser apparatus including a fitting member having first and second openings connected each other and concentric with each other, the first opening served as a semiconductor laser fitting portion, the second opening served as a collimator lens fitting portion, a semiconductor laser fitted into the first opening, and a collimator lens fitted into the second opening.

Other objects, features and advantages of the present invention will become apparent from the following detailed description when read in conjunction with the accompanying drawings.

DESCRIPTION OF THE PREFERRED EMBODIMENTS

A description is given of a preferred embodiment of the present invention.

Figure 5:
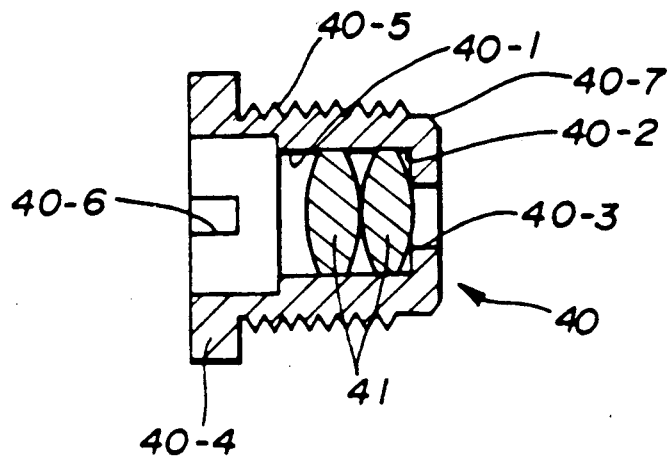
FIG. 5 is a cross sectional view of a lens holder in the embodiment of the present invention.

Referring to FIG. 5, a lens holder 40 of the cylindrical shape is illustrated. The lens holder 40 has a flange portion, and is designed to hold a collimator lens 41 and have a function of the optical axis adjustment. An inside-diameter portion 40-1 of the lens holder 40 is precisely worked so as to fit the outside diameter of the collimator lens 41. The collimator lens 41 consisting of two lenses in the illustrated example, is positioned and held so that it makes contact with the inside-diameter portion 40-1 and a lens surface of the collimator lens 41 is directly or indirectly brought into contact with a holder bottom surface 40-2. In this state, the optical axis of the collimator lens 41 coincides with the center of the inside-diameter portion 40-1. An opening 40-3 is formed in the center portion of the holder bottom surface 40-2 so that light is allowed to pass through the opening 40-3. A flange portion 40-4 is formed on the side of the other end of the lens holder 40. Two grooves 40-6 into which a screw tool can be fitted, are formed in the diameter direction in the flange portion 40-4. A male screw 40-5 is formed in an outer peripheral portion closer to the holder bottom surface 40-2 than the flange portion 40-4. An end portion of the lens holder 40 has a press fitting portion 40-7 which is precisely worked so as to be concentric with the inside-diameter portion 40-1. The press fitting portion 40-7 is chamfered for convenience at the time of press fitting of the lens holder 40.

Figure 4:
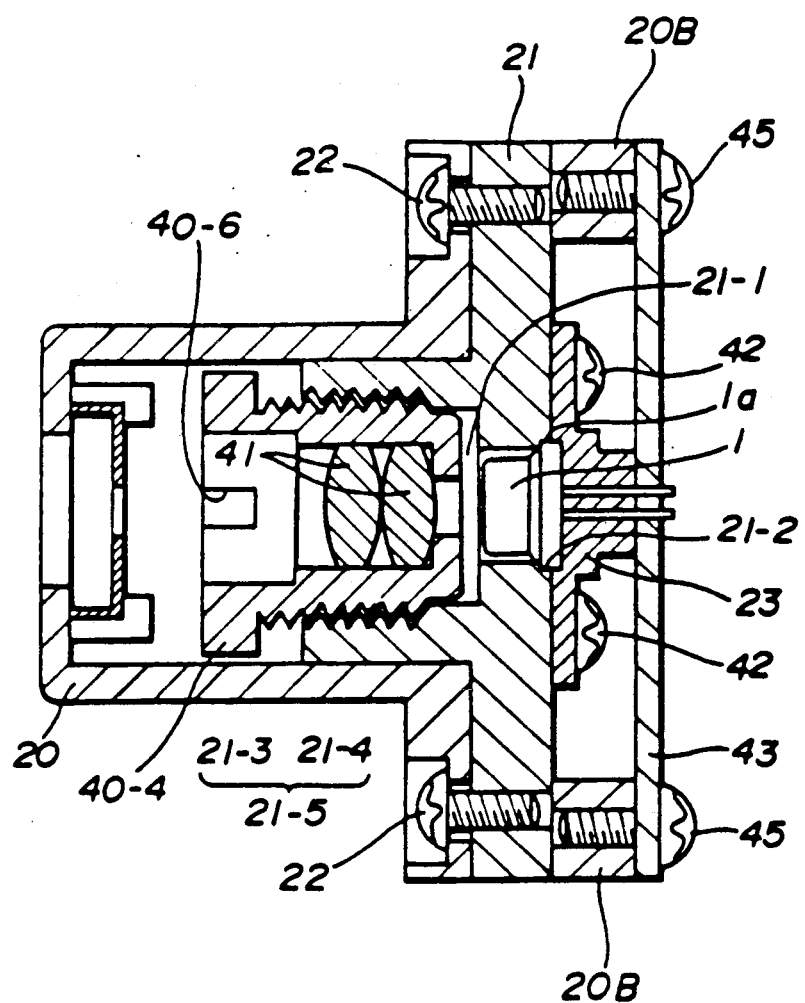
FIG. 4 is a cross sectional view of a preferred embodiment of the present invention.

The lens holder 40 is held in a structure of the embodiment of the present invention, as shown in FIG. 4. Referring to FIG. 4, a flange 21 of an integral member is served as a fitting member to which the collimator lens 41 supported by the lens holder 40 is fastened. The flange 21 has an opening 21-1 at the center portion thereof. A step portion of a counter bore is formed in an end of the opening 21-1, which faces the end of the lens holder 40. This step portion is hereafter referred to as a laser fitting portion 21-2.

The laser fitting portion 21-2 is precisely worked so as to coincide with the outside diameter of a mounting portion 1a of the semiconductor laser 1. Additionally, the depth of the laser fitting portion 21-2 is uniformly formed so as to become identical to a predetermined dimension. The semiconductor laser 1 is positioned in the laser fitting portion 21-2 by press fitting. In the state where the semiconductor laser 1 is held in place, the optical axis of the semiconductor laser 1 already coincides with the axial alignment of the laser fitting portion 21-2. After the press fitting of the semiconductor laser 1, the semiconductor laser 1 is secured by using screws 42, which secures a holder member 23 to the back surface of the mounting portion of the semiconductor laser 1.

On the other end of the opening 21-1, there is formed a collimator lens fitting portion 21-5. The collimator lens fitting portion 21-5 is made up of a female screw 21-3 formed at an outlet portion of the opening 21-1, and an inside-diameter 21-4 having a smooth peripheral surface formed at a back portion thereof. The female screw 21-3 is a screw which engages with the male screw 40-5 of the lens holder 40. The inside-diameter portion 21-4 is precisely worked so that it has the diameter which enables the press fitting portion 40-7 to be press-fitted therein, and is concentric with the laser fitting portion 21-2 of the semiconductor laser 1. The lens holder 40 is fitted into the collimator lens fitting portion 21-5, and is then screwed by using a tool fitted into the grooves 40-6. Thereby, the press fitting portion 40-7 is press-fitted to the inside-diameter portion 21-4. In this state, the optical axis of the semiconductor laser 1 automatically becomes coincident with the optical axes of the collimator lens 41.

A variation of the above-mentioned embodiment can be constructed by directly fitting the collimator lens 41 into the inside-diameter portion 21-4 without using the lens holder 40. In the alternative, the collimator lens 41 and the lens holder 40 are integrally fitted into the inside-diameter portion 21-4.

It is noted that the coincidence of the optical axes of the collimator lens 41 and the semiconductor laser 1 is not necessarily ensured only by screwing the lens holder 40. The lens holder 40 has the press fitting portion 40-7 which contributes to precise positioning of the lens holder 40. By using the press fitting portion 40-7 having a predetermined working accuracy, it becomes possible to omit the optical axis adjustment.

In a case where the flange portion 40-4 is designed to butt into the flange 21, the optical axis adjustment of the collimator lens 41 may be omitted, because it becomes possible to definitely determine the dimension between the semiconductor laser 1 and the collimator lens 41.

Figure 1:
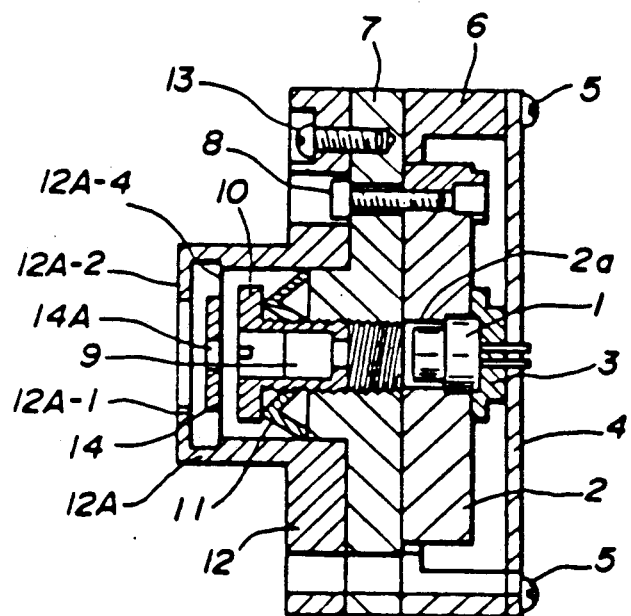
FIG. 1 is a cross sectional view of the conventional semiconductor laser apparatus taken along a line I—I shown in FIG. 2.
Figure 2:
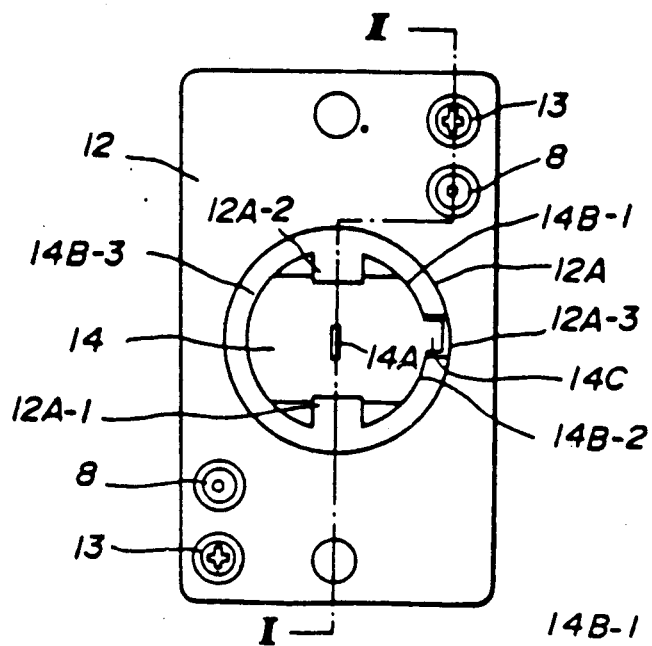
FIG. 2 is a front view of the conventional semiconductor laser apparatus shown in FIG. 1.
Figure 3:
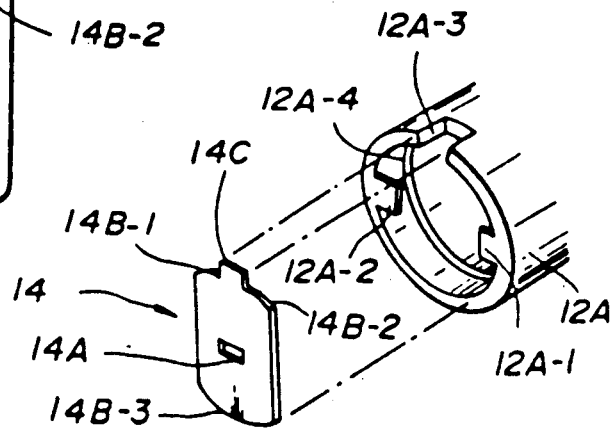
FIG. 3 is a perspective view of a part of the conventional semiconductor laser apparatus of FIG. 2.

The wave-shaped washer 11 shown in FIG. 2 is not needed in the present invention, because the lens holder 40 is held by press fitting. Further, it is possible to construct the semiconductor laser apparatus by a reduced number of parts. This is because the flange 21 is formed so as to integrate with the base 2 and the plate 7 shown in FIG. 4.

The laser drive board 43 on which an electric circuit is formed, is secured to projections 20B integral with an aperture holder 20 by screws 45.

The aperture is attached to the flange 21 as follows. The cylindrical portion 20A, which is a part of the aperture holder 20, projects from a flange portion of the aperture holder 20. The flange 21 is secured by screws 22 to a back portion of the aperture holder 20. A base (not shown) is fastened to the flange 21. As described previously, the projections 20B located at diagonal positions which are integral with the aperture holder 20, project from the back portion of the aperture holder 20. The laser drive board 40 is mounted on the projections 20B.

Figure 6:
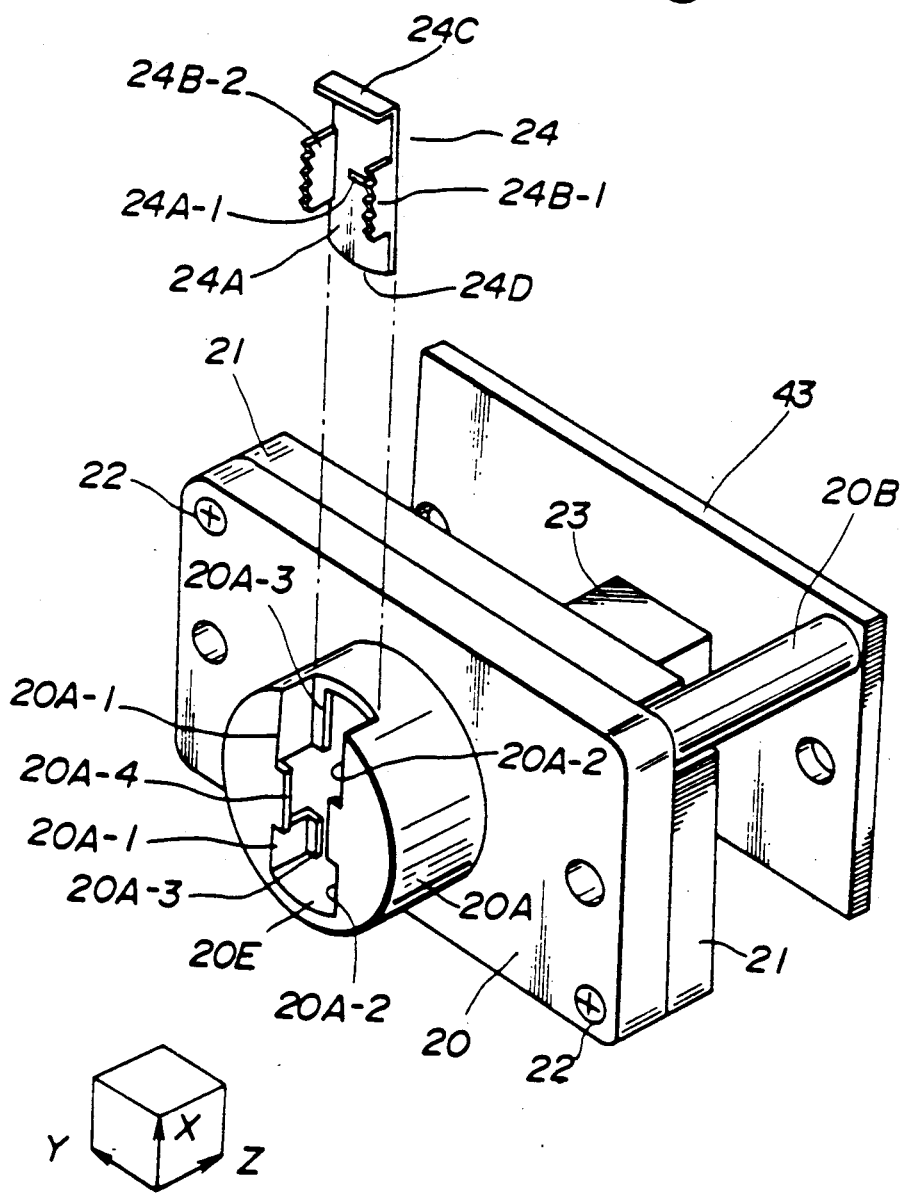
FIG. 6 is a disassembled perspective view of the semiconductor laser apparatus of the present invention.

Referring to FIG. 6, the Z direction of coordinates is coincident with the direction of the optical axis of the semiconductor laser 1. The X direction is a direction orthogonal to the optical axis of the semiconductor laser 1. The Y direction is orthogonal to the X direction. It is assumed that long sides of a slit 24A-1 formed in a slit plate 24 described below are coincident with the Y direction, and short sides thereof are coincident with the X direction in view of efficiency in usage of light and arrangement of the optical system.

The slit plate 24 has a rectangular flat plate portion 24A. The slit 24A-1 is formed at the center of the flat plate portion 24A. As described before, the long sides of the slit 24A-1 are in the Y direction, and the short sides thereof are in the X direction. Two pieces 24B-1 and 24B-2 project vertically from edges of the flat plate portion 24A which are opposite to each other in the Y direction. The pieces 24B-1 and 24B-2 are formed integrally with the flat plate portion 24a, and are of the same shape and the same size. A free edge of each of the pieces 24B-1 and 24b-2 is of a fine saw-teeth shape. The distance between the pieces 24B-1 and 24B-2 is identical to the width of the flat plate portion 24A. It is now assumed that the above-mentioned distance is represented as W.

An L-shaped grip 24C is formed at an upper end of the flat plate portion 24A in the X direction. This is formed by bending the flat plate portion 24A at the upper end portion thereof. A lower end 24D of the flat plate portion 24A opposite to the L-shaped grip 24C is of an arc shape, which fits the inner wall of the cylindrical portion 20A. The lower end 24D of the arc shape functions as a stopper. Therefore, hereafter, the lower end 24D is referred to as a stopper portion 24D.

The cylindrical portion 20A has two pairs of opposed surfaces 20A-1 and 20A-2, which are spaced at a distance identical to the width W. Each pair of opposed surfaces 20A-1 and 20A-2 is parallel to a plane formed by the X and Z directions, and is served as a rotation preventing member which prevents the slit plate 24 from rotating when inserted into the cylindrical portion 20A. Further, the cylindrical portion 20A has flat surfaces 20A-3 and 20A-4, which are opposite to each other in the Z direction and are spaced at a distance slightly narrower than the length of each of the pieces 24B-1 and 24B-2 in the Z direction. The flat surfaces 20A-3 are integral with the opposed surfaces 20A-1 and 20A-2, and stand upright therefrom. The flat surfaces 20A-4 are inner surfaces of opposing craw portions opposite to each other in the Y direction, and are located at a position different, in the X direction, from positions of the flat surfaces 20A-3.

In a space surrounded by the opposed surfaces 20A-1 and 20A-2, and the flat surfaces 20A-3 and 20A-4, a lower portion of the space is defined by the inner peripheral wall of the cylindrical portion 20A. Hereafter, the above lower portion of the space is referred to as a positioning portion 20E.

When inserting the slit plate 24 into the cylindrical portion 20A, the grip 24C is gripped by fingers, and is moved down in the X direction. At the commencement of the above insertion, the flat plate portion 24A is fitted to and guided by the opposed surfaces 20A-1 and 20A-2 served as the rotation preventing member. Then the flat plate portion 24A is brought into pressure contact with the flat surfaces 20A-3, and at the same time, the saw-teeth portions of the pieces 24B-1 and 24B-2 bite into the flat surfaces 24A-4. Then in a state where the stopper portion 24D of the slit plate 24 is brought into contact with the positioning portion 20E, the slit plate 24 is positioned and held stationary in the cylindrical portion 20A. In the above-mentioned fitting state, the slit 24A-1 is correctly positioned on the optical axis.

Figure 7:
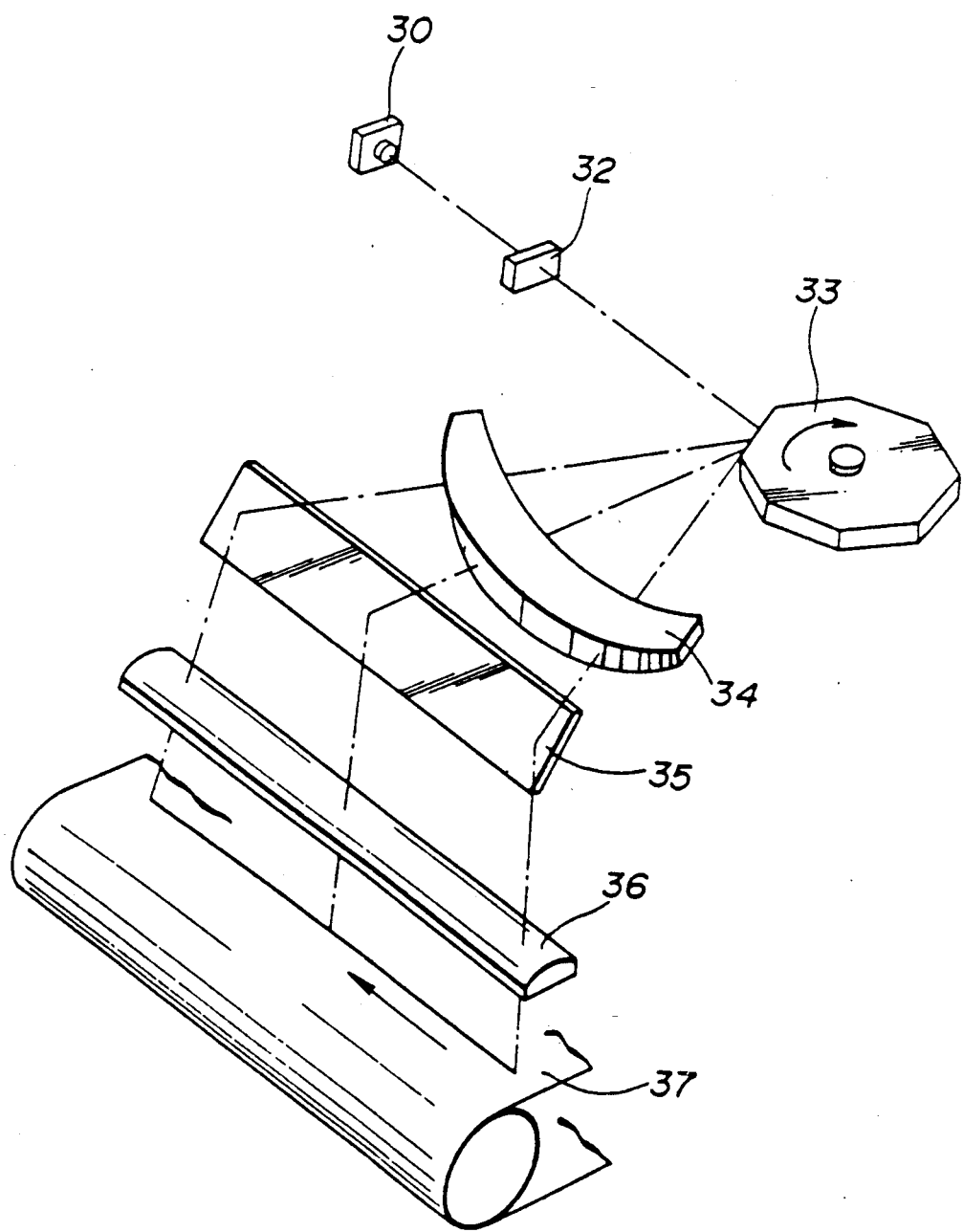
FIG. 7 is a view illustrating an optical system to which the present invention is applicable.

The semiconductor laser apparatus of the embodiment of the present invention is suitably applied to an optical system shown in FIG. 7. Referring to FIG. 7, a laser beam emitted from a semiconductor laser apparatus 30 having the structure described previously, passes through a cylindrical lens 32, and is irradiated on a rotary polygon mirror 33. The laser beam passing through the cylindrical lens 32 is deflected on the rotary polygon mirror 33, and then passes through a fθ lens 43, a reflection mirror 35 and a cylindrical lens 36. Then the laser beam from the cylindrical lens 36 is imaged in the form of a spot on a photosensitive member 37 of a belt shape.

The laser beam emitted from the semiconductor laser apparatus 30 is a modulated laser beam. Due to the rotation of the rotary polygon mirror 33, the laser beam scans the photosensitive member 37 in a main scanning direction, which is rotated in a sub scanning direction. A surface of the photosensitive member 37 is uniformly precharged to a predetermined polarity. A charge on a portion of the surface on which the spot of the laser beam is irradiated, is selectively discharged. Thereby, an electrostatic latent image corresponding to an image to be recorded or reproduced, is successively formed on the photosensitive member 37. The image on the photosensitive member 37 is then changed to a visual image, which is then transferred to a print member such as paper.

Conventionally, it is considered that the optical axis adjustment is one of the essential procedures in semiconductor laser apparatuses, particularly in a case where the optical length of a semiconductor laser unit is relatively long, because an error of optical axes increases due to the principle of a pendulum. Recently, there is a tendency in which the optical length of semiconductor laser units is reduced. From this viewpoint, it is very advantageous to provide semiconductor laser apparatuses in which the coincidence of optical axes is easily obtainable within a range of working accuracy.

The present invention is not limited to the embodiments, and variations and modifications may be made without departing from the scope of the present invention.

What is claimed is:

1. A semiconductor laser apparatus comprising:
    a fitting member having a first opening and a second opening which are connected to each other and are concentric with each other, said first opening serving as a semiconductor laser fitting portion and said second opening serving as a collimator lens fitting portion;
    a semiconductor laser fitted into said first opening; and
    a collimator lens and a lens holder in which said collimator lens is accommodated, said lens holder being fitted into said second opening;
    wherein:
    said lens holder has through holes in opposed walls thereof and a male screw thread formed around a peripheral surface thereof, and said second opening has a female screw thread formed at an inner surface thereof,
    said lens holder has a press-fitting portion formed at an end portion of said lens holder located on the side of said first opening and formed on a surface of said lens holder which is the same as the surface at which said male screw thread is formed, and
    said lens holder is inserted into said second opening by the engagement of said male and female screw threads and is positioned therein by press-fitting said press-fitting portion of said lens holder into said second opening of said fitting member, thereby eliminating a need for manual alignment of optical axes and manual focus adjustment.

2. A semiconductor laser apparatus as claimed in claim 1, wherein a lens surface of said collimator lens is kept in contact with one of said walls of said lens holder located on the side of said first opening.

3. A semiconductor laser apparatus as claimed in 1, wherein said lens holder has a flange portion formed at an end portion thereof on the side opposite to said first opening, and said flange portion has a groove into which a tool for screwing said lens holder can be is fitted.

4. A semiconductor laser apparatus as claimed in 1, further comprising an aperture holder mounted on said fitting member and having a cylindrical portion so as to enclose said collimator lens.

5. A semiconductor laser apparatus as claimed in claim 4, wherein said aperture holder has a slit plate supporting portion into which there is fitted a slit plate having a slit through which a laser beam emitted from said semiconductor laser and passing through said collimator lens is shaped.

6. A semiconductor laser apparatus as claimed in claim 5, wherein said slit plate supporting portion comprises two pairs of opposed surfaces opposite to each other in a first direction perpendicular to an optical axis of said semiconductor laser, flat surfaces extending from respective opposed surfaces in said first direction, and two craw portions opposed to each other in said first direction, each positioned between one of one pair of opposed surfaces and one of the other pair of opposed surfaces, and a stopper portion which is a part of an inner wall of said lens holder.

7. A semiconductor laser apparatus as claimed in claim 6, wherein said slit plate comprises:

a flat plate portion in which said slit is formed, two pieces opposite to each other in said first direction and projecting from ends of said flat plate portion in said optical axis of said semiconductor laser, a free end of each of said two pieces being of a saw-teeth shape which engages with said respective craw portions, a grip portion formed in an end of said flat plate portion, and an arc-shaped end of said flat plate portion opposite to said grip.

8. A semiconductor laser apparatus as claimed in claim 1, wherein said lens holder comprises a through hole into which said collimator lens is accommodated, and wherein the diameter of said through hole is identical to the diameter of said collimator lens.

9. A semiconductor laser apparatus as claimed in claim 1, wherein said semiconductor laser is fitted into said first opening of said fitting member by press fitting.

10. A semiconductor laser apparatus as claimed in claim 1, wherein said semiconductor laser comprises a fitting portion having a diameter identical to that of said first opening of the fitting member, and wherein said fitting portion of said semiconductor laser being fitted into and held in said first opening.

* * * * *